US009333722B2

(12) United States Patent
Aquarius (10) Patent No.: US 9,333,722 B2
(45) Date of Patent: May 10, 2016

(54) BLOW UNIT FOR AN APPARATUS FOR MAKING AIR-FILLED BAGS, APPARATUS COMPRISING SUCH A BLOW UNIT, SYSTEM COMPRISING SUCH AN APPARATUS AND A METHOD FOR MAKING AIR-FILLED BAGS

(75) Inventor: Pieter Theodorus Joseph Aquarius, Stramproy (NL)

(73) Assignee: IDEEPAK HOLDING B.V., Stramproy (NL)

( * ) Notice: Subject to any disclaimer, the term of this patent is extended or adjusted under 35 U.S.C. 154(b) by 782 days.

(21) Appl. No.: 13/513,357

(22) PCT Filed: Dec. 3, 2010

(86) PCT No.: PCT/NL2010/050818
§ 371 (c)(1),
(2), (4) Date: Jul. 25, 2012

(87) PCT Pub. No.: WO2011/068410
PCT Pub. Date: Jun. 9, 2011

(65) Prior Publication Data
US 2012/0279174 A1    Nov. 8, 2012

(30) Foreign Application Priority Data
Dec. 4, 2009   (NL) .................................... 2003907

(51) Int. Cl.
*B65B 31/00*     (2006.01)
*B65B 31/06*     (2006.01)
(Continued)

(52) U.S. Cl.
CPC .......... *B31D 5/0073* (2013.01); *B29C 66/3452* (2013.01); *B29C 66/439* (2013.01); *B29C 65/22* (2013.01); *B29C 65/222* (2013.01); *B29C 66/1122* (2013.01); *B29C 66/872* (2013.01);
(Continued)

(58) Field of Classification Search
CPC ........ B65B 31/00; B65B 31/06; B29C 49/00; B31D 5/0073
USPC .............................. 53/79, 403, 432, 473, 512
See application file for complete search history.

(56) References Cited

U.S. PATENT DOCUMENTS 3,660,189 A * 5/1972 Troy .............................. 156/145
7,185,474 B2 * 3/2007 Perkins et al. .................... 53/79
(Continued)

FOREIGN PATENT DOCUMENTS

WO    WO 01/85434 A2   11/2001
WO    WO 2006/101391    9/2006

*Primary Examiner* — Andrew M Tecco
*Assistant Examiner* — Praachi M Pathak
(74) *Attorney, Agent, or Firm* — Preti Flaherty Beliveau & Pachios LLP (57) ABSTRACT

Blow unit for an apparatus (1) for making air-filled bags from a film material (F) having chambers (12), wherein the blow unit (8) comprises a body (26) having an outlet opening (28) for introducing air into the chambers, wherein the blow unit comprises a guiding element (30) for guiding the film material towards the outlet opening, wherein the blow unit (8) comprises an air guiding space (32) that extends from the outlet opening (28) over a distance (D) at least partly along the guiding element, wherein a length (L) of the air guiding space (32) is such that in use, during introducing air into the film material (F), the air guiding space enables introduction of air into two adjacent chambers (12a, 12b) at the same time. The invention further relates to an apparatus comprising such a blow unit, a system comprising such an apparatus and a method for making air-filled bags.

17 Claims, 5 Drawing Sheets

(51) Int. Cl.
  *B29C 49/00* (2006.01)
  *B31D 5/00* (2006.01)
  *B05B 1/00* (2006.01)
  *B05B 1/04* (2006.01)
  *B65B 39/00* (2006.01)
  *B29C 65/22* (2006.01)
  *B29C 65/00* (2006.01)
  *B29L 22/02* (2006.01)
  *B29L 31/00* (2006.01)

(52) U.S. Cl.
  CPC .......... *B29C 66/876* (2013.01); *B29C 2793/00* (2013.01); *B29L 2022/02* (2013.01); *B29L 2031/7128* (2013.01); *B29L 2031/7138* (2013.01); *B29L 2031/737* (2013.01); *B31D 2205/0023* (2013.01)

(56) References Cited

U.S. PATENT DOCUMENTS

| | | | |
|---|---|---|---|
| 8,357,439 B2 * | 1/2013 | Wehrmann | 428/35.2 |
| 2006/0042184 A1 * | 3/2006 | Perkins et al. | 53/79 |
| 2006/0090421 A1 * | 5/2006 | Sperry et al. | 53/403 |
| 2007/0251631 A1 | 11/2007 | Garceau et al. | |
| 2008/0014389 A1 * | 1/2008 | Wehrmann | 428/35.2 |
| 2008/0022630 A1 * | 1/2008 | Fuss et al. | 53/79 |

* cited by examiner

BLOW UNIT FOR AN APPARATUS FOR MAKING AIR-FILLED BAGS, APPARATUS COMPRISING SUCH A BLOW UNIT, SYSTEM COMPRISING SUCH AN APPARATUS AND A METHOD FOR MAKING AIR-FILLED BAGS

TECHNICAL FIELD

The invention relates to a blow unit for an apparatus for making air-filled bags from a film material having chambers, wherein the blow unit comprises a body having an outlet opening for introducing air into the film material, at least into the chambers thereof, wherein the blow unit further comprises a guiding element for guiding the film material towards the outlet opening.

BACKGROUND

Such a blow unit is known from practice and is for instance disclosed in WO 2006/101391 A1 of applicant. The known blow unit comprises a body that is attachable to a pump unit for supplying gas, an outlet opening in said body for delivering the supplied gas to the film material passing the outlet opening. The blow unit may further comprise a guiding element that is adapted to guide the film material such that the outlet opening and the film material are positioned with respect to each other in a predetermined way. Furthermore, the blow unit may comprise a cutting element, such as a knife for cutting the film material. The known blow unit can be used in an apparatus for making air-filled bags from a film material comprising chambers. The film material may for instance be a tubular foil having two longitudinally extending edges, the tubular foil further comprising transverse rows of perforations located at mutual distance to form the different chambers. Transverse welds may be arranged on either side of every transverse row of perforations at a short distance thereof. With such a foil material, air can be introduced into the chambers via a mouth of the chamber that extends in between two transverse welds. The guiding element of the blow unit enters the chamber adjacent the first of the two opposing transverse welds. The cutting element, for instance a knife, cuts the longitudinal edge of the tubular foil adjacent the blow unit such that the tubular foil can pass the outlet opening of the blow unit. Via said outlet opening, air is introduced in the inner space of the chamber that is enclosed by the other one of the longitudinal edges and the two opposing transverse welds. After completely filling the chamber with air, the chamber is sealed by means of a sealing unit arranged downstream of the blow unit.

Developments in the air-filled cushion packaging material industry demand for increasingly faster apparatuses for making air filled cushions from different kinds of film material having different kinds of cushion configurations. Such apparatuses also need to be able to make air-filled cushions from relatively thin, and thus relatively inexpensive, film material, without increasing the risk of damaging the film material. This is especially important when an apparatus has to be re-adjusted often to be able to change between different film materials, having different configurations and/or having a different film material thickness during a short period of time. This may for instance occur in large distribution companies or smaller companies that aim at packing different kinds of products in different kinds of packaging.

A disadvantage of the known apparatus having the known blow unit is that when using another kind of film material for instance with relatively complex configurations, thus a complex pattern of welds and seals, for instance comprising multiple transverse and longitudinal rows of relatively little cushions for instance separated by longitudinal rows of point seals and multiple transverse welds extending at mutual little distance, the known blow unit is not able to produce air-filled cushions with a sufficient filling degree. When introducing air via the outlet opening in the inner spaces of the respective cushions in a first transverse row of cushions, only the cushions most adjacent the outflow opening are filled in the predetermined time with the predetermined filling degree. If the predetermined filling degree has to be obtained, the filling time will increase and the film material may be damaged.

BRIEF SUMMARY

Therefore, an object of the invention is to provide a blow unit of the type mentioned hereinabove that at least partly overcomes the above mentioned drawbacks. More in particular the invention contemplates providing a blow unit that can be used for high-speed making air-filled bags from different kinds of film material with different kinds of configurations of chambers and sealing seam patterns and different kinds of film material thicknesses such that the air-filled bags or cushions can be filled with the desired filling degree.

These and further objects are at least partly achieved with a blow unit of the above mentioned type, characterized in that the blow unit further comprises an air guiding space that extends from the outlet opening over a distance at least partly along the guiding element, wherein a length of the air guiding space is such that in use, during introducing air into the film material, the air guiding space enables introduction of air into a chamber opposite the outlet opening and an adjacent, preferably upstream, chamber at the same time.

By providing the blow unit with an air guiding space that extends from the outlet opening at least partly along the guiding element, preferably in an upstream direction, air supplied by the blow unit can be introduced in the chamber in the film material opposite of the outlet opening with a relatively high pressure to obtain the high filling degree of said chamber. Since the air is introduced in said pocket with a high pressure, part of the air is able to escape from said chamber by means of the air guiding space, such that damaging of the film material forming said chamber can be prevented. Especially, for film material comprising a complex pattern of sealing seams and chambers this may be of importance. Consequently, the air guiding space enables processing of film material with a relatively thin thickness, of for instance 20 μm on the apparatus for making air-filled bags comprising the blow unit according to the invention. This thin film material can be processed with a relatively high speed without increased risk of tearing of the film material. Since the air flow through the air guiding space in the guiding element at the same time forms an air film around the guiding element, at least partly, easy guidance of the film material along the guiding element of the blow unit is obtained, even with high speed filling of the bags.

Furthermore, due to said air guiding space air supplied by the blow unit can be introduced in the film material over a larger distance than only adjacent the outlet opening of said blow unit. The largest amount of the supplied air will be introduced in the downstream chamber in the film material that is positioned substantially opposite the outlet opening. At the same time, a part of the supplied air escapes from the air stream entering the downstream chamber and will flow through the air guiding space in a direction upstream of the outlet opening. This part of the supplied air is able to enter the upstream chamber that is provided adjacent the downstream chamber that, at that moment, is filled via the outlet opening of the blow unit. Consequently, the foil walls of the downstream chamber will be subjected to less tension. Due to the air already entering the upstream chamber, the film material enclosing said chamber is able to stretch a little, which enables easier filling of said chamber when it is positioned adjacent the outflow opening of the blow unit after being transported along the blow unit. All these advantages enhance the filling speed of the chambers in the film material thereby reducing risk of damaging the film material and at the same time enabling filling of said chambers in a predetermined way with a predetermined filling degree.

Preferably, the air guiding space has a substantially elongate shape having a length that is adapted to a width of a mouth of the chambers in the film material. Dependent on the size of the chambers, especially on the width of the mouth of the chambers in the film material, an air guiding space may be provided in the guiding element of the blow unit. When the mouth is very small, the air guiding space may have a smaller length. However, if the air guiding space has a relatively larger length with respect to the width of the mouth of the chamber, air may be introduced in the downstream chamber opposite the outflow opening and at the same time a part of the supplied air may be introduced in two adjacent upstream chambers. The air guiding space may have a substantially elongate bottom, a substantially elongate top and a surrounding wall. The elongate top may for instance be completely open or may comprise multiple openings arranged along the entire length of the air guiding space. The elongate top may define an air guiding space opening with an air guiding space opening circumference.

It is noted that the mouth of the chamber may be defined as the opening of the chamber that extends between two transverse welds provided in the film material.

To be able to direct the airstream coming from the blow unit in a predetermined way into the upstream chamber, an end of the air guiding space may have such a shape that in use air passing through said space is directed in a direction away from the guiding element, preferably a direction extending between 15-90 degrees with respect to a plane extending through the guiding element. The wall of the air guiding space that faces away from the outlet opening may for instance be substantially concave or may flare from the bottom of the air guiding space towards the opposite open top of the air guiding space.

Preferably, according to a further aspect of the invention, a plane extending through a circumference of the outlet opening at the same time extends substantially perpendicular to a guiding direction of the guiding element. The guiding direction may be substantially opposite to the transporting direction of the film material along the guiding element. By providing the outlet opening substantially perpendicular to the guiding direction and thus to the transporting direction of the film material, air may be supplied to the inner space of the film material easily thereby enhancing complete filling of the film material when transporting the material with a desired transporting speed of approximately 22 m/min.

A plane extending through the circumference of the air guiding space opening may extend substantially parallel to the guiding direction of the guiding element.

In further elaboration of the invention, the blow unit comprises an inlet opening that is mountable to a pump unit, wherein a plane through the circumference of the inlet opening may extend substantially perpendicular to the plane through the outlet opening. By providing the inlet opening in an angle with respect to the outlet opening, the air channel between the inlet opening and the outlet opening has a substantially curved shape.

Preferably, the air channel provided in between the respective inlet and outlet openings is a substantially rigid channel. The rigidity of the channel provides for sufficient air swirl to enable proper separation of the foil layers to provide a desired filling degree of the chambers of the film material. To further increase the air swirl capacity of the air channel, a ratio of the inlet opening diameter to the outlet opening diameter may be approximately between 3:1 and 4:1.

In order to be able to fill the film material with a desired maximum filling degree while transporting the film material with a desired maximum transporting speed for instance of approximately 22 m/min, a ratio of the length of the air guiding space to the diameter of the outlet opening may preferably be approximately 15:1. Due to such features of the blow unit, the pressure inside the film material may be increase to atmospheric pressure thereby preventing the film material from internal deformations.

In further elaboration of the invention, the blow unit further comprises a cutting element for cutting the film material such that the film material can pass the blow unit. When using tubular foil or centrefold foil with one of the longitudinal edges joined together to form a tube, the film material can be guided towards the outlet opening along the guiding element. In order to be able to pass the outlet opening and the rest of the body of the blow unit, the longitudinal edge of the foil material that faces the blow unit has to be opened. Therefore, the cutting element is provided adjacent the outflow opening. Preferably, the cutting element is coupled to the body at a side of the guiding element facing away from the air guiding space.

It is noted that tubular foil is an extrusion foil having two layers of elongate foil with first and second longitudinal edges and that centrefold foil is a foil folded in the middle forming one of the longitudinal edges such that two superposed layers of foil are obtained wherein the other one of the longitudinal edges is formed by bonding the two layers, for instance by sealing thereof.

In order to further adapt the blow unit according to the invention to different kinds of film material to be used to make air-filled bags, the cutting element may be displaceably arranged with respect to the outlet opening of the blow unit. Dependent of the kind of film material and the size of the preconfigured chambers in said material the cutting element may be located adjacent the outflow opening or more remote from the outflow opening.

According to another aspect of the blow unit according to the invention, the cutting element is displaceable between a first position, wherein the cutting element is located adjacent, for instance downstream of, the outlet opening, and a second position, wherein the cutting element is located upstream of the outlet opening. When the cutting element is located adjacent the outlet opening, the blow unit is suitable for inflating cushion foil comprising a relatively large amount of relatively little cushions, which cushions are arranged in a pattern of transverse and longitudinal rows. By providing the cutting element adjacent the outflow opening inflating of the cushions with a relatively high filling degree is possible since air is prevented from leaving the inner space of the chamber. When the cutting element is located remote from the outflow opening, in the second position, the blow unit is suitable for inflating the chambers of a foil material with large chambers that extend from one of the longitudinal edges of the elongate foil towards the other one of the longitudinal edges.

To provide the different positions of the cutting element, the body of the blow unit may comprise at least two cutting element receiving locations for receiving the cutting element in the first position and the second position, respectively. The cutting element may for instance be connected to one of the first and second positions, for instance by means of a screw connection. Displacement of the cutting element may be obtained by removing the screw and reintroducing the screw connection after the cutting element is brought from one of the positions to the other one of the positions.

In an alternative embodiment of the invention, the cutting element may be slidably arranged with respect to the body. Displacement of the cutting element may be easy, which may be advantageous when change in kinds of film material to be used has to occur often in a relatively little period of time.

To enhance the guidance of the film material along the guiding element, it may be advantageous if, according to another aspect of the invention, the length of the guiding element can be varied in dependence of the kind of film material to be used for making the air-filled bags.

The invention further relates to an apparatus for making air-filled bags from a film material, wherein the apparatus has an inflating unit comprising a blow unit as above described and a pump unit operatively coupled to the blow unit for supplying air via the blow unit into the film material, wherein the apparatus further comprises a sealing unit preferably arranged downstream of the blow unit.

Furthermore, the invention relates to a system for making air-filled bags from a film material, the system comprises:
- an amount of film material, preferably an elongate double layered foil such as a tubular foil or a centrefold foil having two longitudinally extending edges, the foil further comprising transverse welds located at mutual distance to form different chambers, wherein the foil further comprises rows of transverse perforations arranged between two adjacent transverse welds, preferably at a short distance thereof, to be able to separate the respective chambers from each other; and
- the above mentioned apparatus for making air-filled bags from said film material.

The invention also relates to a method for making air-filled bags from a film material, wherein the method comprises the steps of:
- providing the above mentioned apparatus for making air-filled cushions from a film material comprising the above described blow unit;
- providing an amount of film material having chambers with chamber mouths through which the chambers can be filled with air;
- guiding the film material towards the blow unit such that a mouth of a downstream chamber is positioned substantially opposite the outlet opening and a mouth of an upstream chamber is positioned substantially opposite at least part of the air guiding space;
- supplying air to the downstream chamber to completely fill said chamber and at the same time introducing air into the upstream chamber via the air guiding space;
- sealing of the mouth of the chamber to trap the air inside said chamber;
- cutting of the longitudinal edge of the film material to be able to move the film material along the blow unit in a direction from the guiding element towards the sealing unit.

Such an apparatus, system and method provide similar effects and advantages as described with the blow unit according to the invention.

BRIEF DESCRIPTION of DRAWING

Further elaborations of the invention are described in the subclaims. Presently, the invention will be further elucidated on the basis of exemplary embodiments and the drawing. In the drawing:

DETAILED DESCRIPTION

In this specification, identical or corresponding parts are indicated with identical or corresponding reference numerals.

Figure 1:
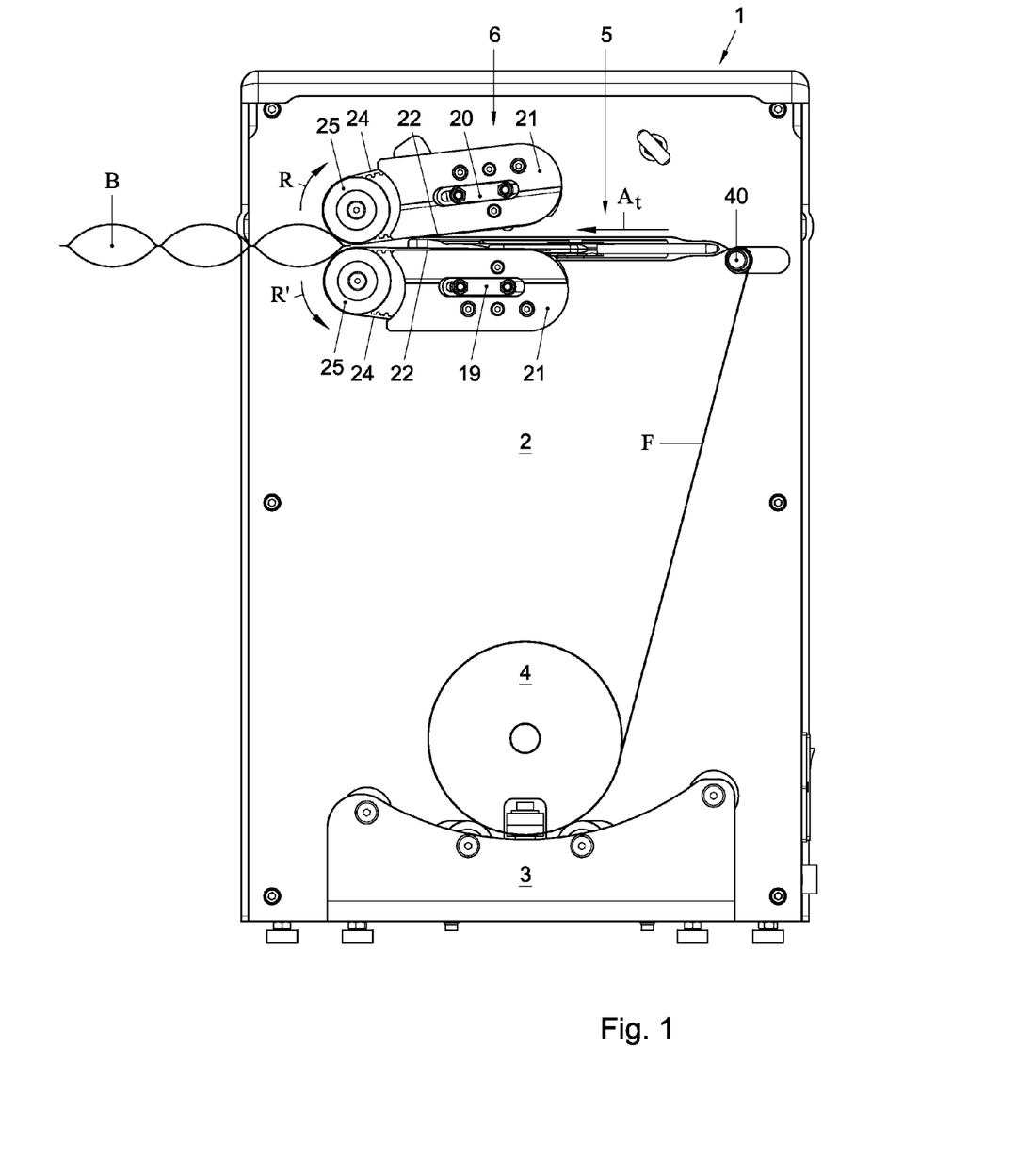
FIG. 1 shows a schematic side view of an apparatus for making air-filled cushions according to an embodiment of the invention.

In FIG. 1, a schematic side view of an embodiment of an apparatus 1 for making air-filled bags according to the invention is shown. The apparatus 1 comprises a housing 2 with a receiving section 3 for receiving a roll 4 of film material F. The receiving section 3 is adapted to support the roll 4 of film material F such that it can rotate freely with respect to the receiving section 3, such that the foil F can be transported to the blow unit 8 to be filled and sealed for making the air-filled bags B.

Downstream of the receiving section 3 successively an inflating unit 5 and a sealing unit 6 are provided, for respectively filling the chambers 12 of the film material F and sealing the filled chambers 12 to trap the air inside said chambers. The inflating unit 5 comprises a blow unit 8 according to an embodiment of the invention and a pump unit 10 (see FIG. 2) for supplying air to the blow unit 8, which blow unit 8 is adapted to introduce air into the respective chambers 12 of the film material F. The blow unit 8 according to the invention will be described in detail later on, referring to FIGS. 3-6.

The film material F may be a plastic film material and may comprise an elongate foil like a tubular foil or a centrefold foil subdivided into chambers 12 by means of a pattern 14 (see FIG. 5) of welds and rows of perforations 19 defining the chambers 12 to be filled to form the air-filled bags B. The chambers 12, at least the chambers most adjacent the first longitudinal edge 15 of the foil F, comprise a chamber mouth 13 that enables air from the blow unit 8 to enter into the inner space of the respective chamber 12. The pattern 14 may comprise cross sealing seams 17 that do not extend over the entire width of the tubular foil but end at some distance S from a longitudinal edge 15 of the tubular foil (see for instance FIG. 6). The pattern may further comprise longitudinally sealing seams 18 that extend substantially parallel to the longitudinal edges 15, 16 of the tubular foil F. The apparatus 1 may be used for manufacturing packaging material, in this case air-filled bags, in situ.

Figure 6:
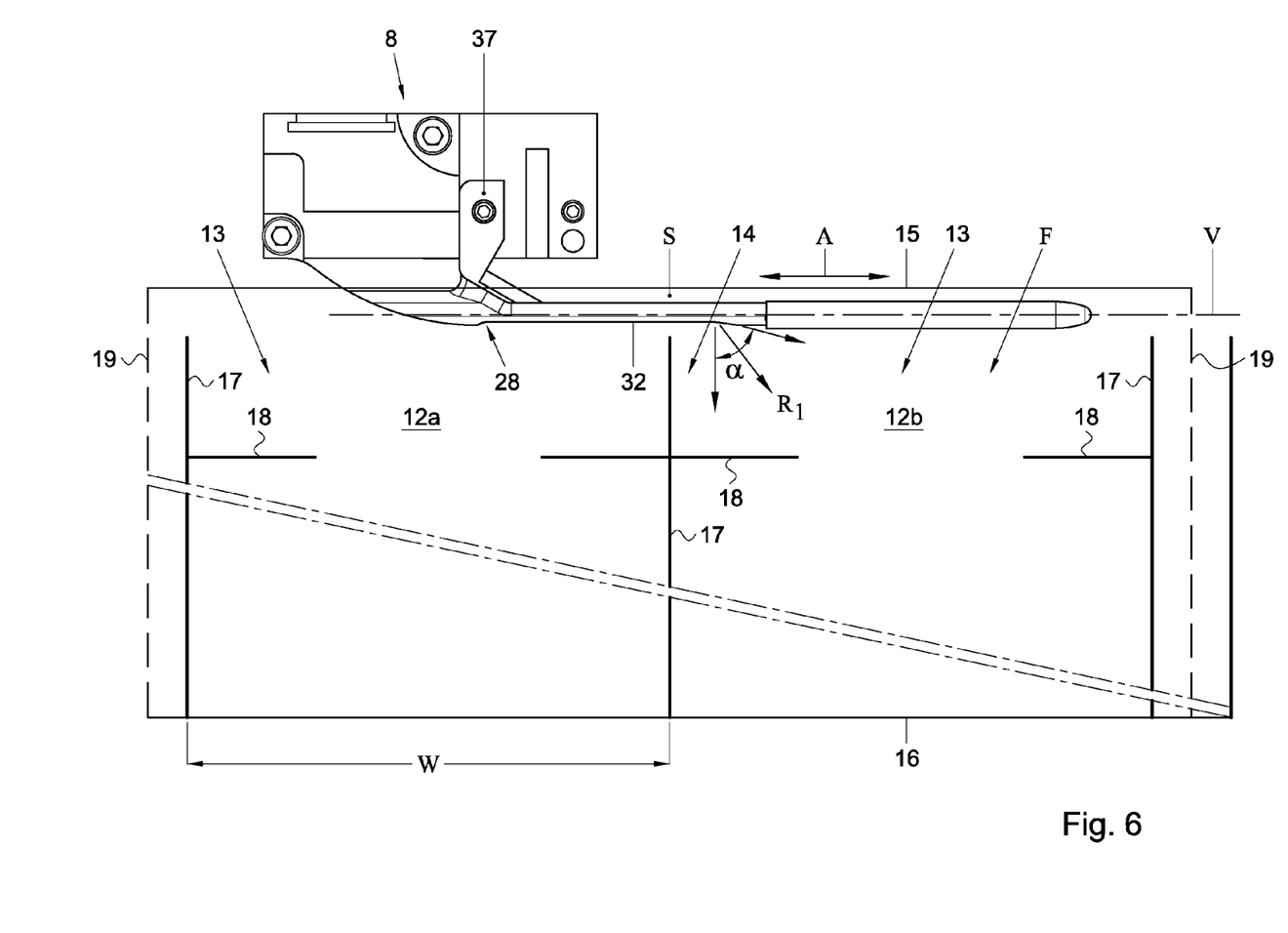
FIG. 6 shows a schematic top view of the blow unit as shown in FIG. 5 during filling of the film material.

The sealing unit 6 is adapted to provide a longitudinal weld or sealing seam between the ends of two opposite cross sealing seams 17, the sealing seam preferably is spaced from the longitudinal edge 15 of the foil. The sealing seam closes the chamber mouth 13 of the chamber 12 that is filled with air. The sealing unit 6 comprises two blocks 19, 20 which in FIG. 1 are hidden from view for the larger part by two covering plates 21. The covering plates 21 may serve for protection and guidance of the film material F. The blocks 19, 20 are moveably suspended in the housing 2. In the shown embodiment of the apparatus 1 in FIG. 1, the upper block 20 can be tilted upwards, in order to, for instance facilitate insertion of a new roll 4 of foil material F or to liberate jammed foil material. In use, the blocks 19, 20 abut against each other with at least a part of their large side 22. Between the blocks 19, 20, at least one heating element, such as a sealing thread, is provided to bond together the layers of the foil material after the chamber 12 is filled with air.

Around both blocks 19, 20, an endless circulating belt 24 closed upon itself is provided. At an end 23 of each of the blocks 19, 20 that faces away from the blow unit 8, a roller 25 may be provided to drive the respective endless circulating belt 24 such that the film material F may be transported along the inflating unit 5 and the sealing unit 6. Therefore, the rollers 25 may be driven by drive and/or transmission means not further shown, at the same rate but in opposite directions (as indicated by arrows R, R').

In the exemplary embodiment shown (see FIG. 2), the inflating unit 5 comprises the pump unit 10 and the blow unit 8 connected thereto. The inflating unit 5 is adapted to blow compressed air (or a different suitable medium, in particular gas) into the chambers 12 of the foil tube F. Referring to FIGS. 2-6, the blow unit 8 comprises a body 26 having an inlet opening 27 connected to the pump unit 10 and an outlet opening 28, in fluid connection with the inlet opening 27, for introducing air into the film material F. The outlet opening 28, more specifically a plane P1 through the circumference of the outlet opening 28, extends substantially perpendicular to the guiding direction G of the guiding element 30 that extends from the outlet opening 28. The guiding element 30 comprises a somewhat rod-shaped element. The guiding element 30 has a substantially rounded free end 31 that enables smooth guidance of the film material F past said free end 31. It is noted that the guiding direction G is opposite to the transporting direction At of the film material F (see FIG. 1). The outlet opening 28 extends substantially perpendicular to the inlet opening 27. Between the inlet opening 27 and the outlet opening 28 a substantially rigid air guiding channel 26a, in the shown embodiment with a curved shape, is provided. Due to the rigid nature of the air guiding channel 26a sufficient air swirl may be created to enable separation of the respective foil layers of the film material. To further enable creation of the desired air swirl preferably a ratio of the inlet opening diameter D to the outlet opening diameter d is approximately between 3:1 and 4:1. For instance, the inlet opening 27 may have a diameter 27a of approximately 20 mm and the outlet opening 28 may have a diameter 28a of approximately 5 mm.

The blow unit 8 further comprises an air guiding space 32 that extends from the outlet opening 28 over a distance D (see FIG. 3) along part of the guiding element 30. The distance D comprises such a length L that in use, during introducing air into the film material F, the air guiding space 32 enables introduction of air into two adjacent chambers 12a, 12b at the same time. This will be explained further later on with reference to FIG. 6. The air guiding space 32 has a substantially elongate shape having a length L that is adapted to a width W (see FIG. 6) of the mouth 13 of the chambers 12 in the film material F. The air guiding space 32 preferably extends within an outer perimeter of the guiding element 30, such that the guiding element 30 remains streamlined for guidance of the film material F. The air guiding space 32 may have a substantially elongate bottom 33 and a substantially elongate top 34, in the shown embodiment an elongate opening, and a surrounding wall 35 that surrounds the respective perimeters of the top 34 and the opening 35. Preferably, the elongate opening may be defined by a circumference C of the air guiding space opening. Said circumference may extend through a plane P2 that extends substantially perpendicular to plane P1 and substantially parallel to plane V. The ration of the length L of the air guiding space 32 to the diameter 28a of the outlet opening 28 preferably is approximately 15:1.

In another embodiment of the invention, the top 34 may be partly closed and may comprise multiple openings arranged in line along the entire length L of the air guiding space 32 instead of one large opening 34. The part 36 of the surrounding wall 35 that is provided remote from the outlet opening 28 may have such a shape that, in use, air passing trough said space 32 is directed in a direction R1 (see FIG. 6) form the guiding element 30. The direction R1 may for instance extend in an angle α between 15-90 degrees with respect to a plane V extending through the guiding element 30. In the shown embodiment of the blow unit 8 according to the invention, the wall 36, i.e. the part of the surrounding wall 35 of the air guiding space 32 flares from the bottom 33 of the air guiding space 32 towards the open top 34 thereof. In another (not shown) embodiment of the invention, the wall 36 may instead be concave or have another kind of shape such that the air coming from the air guiding space may be directed in a predetermined direction R1.

The blow unit 8 further comprises a cutting element, in this case a knife 37, for cutting the film material F adjacent the outflow opening 28 such that the film material F can pass the blow unit 8 after filling of the chambers 12 with air. In the shown embodiment of the blow unit 8 according to the invention, the knife 37 is provided at substantially the same position as the outflow opening 28, seen in a direction A extending substantially parallel to the guiding element 30. In this case, cutting of the first longitudinal edge 15 of the film material F takes place at substantially the same moment as filling the chamber 12 opposite the outlet opening 28. The knife 37 is coupled to the body 26 of the blow unit 8 at a side of the guiding element 30 facing away from the air guiding space 32. The knife 37 is provided at a first cutting element receiving location 38 provided in the body 26. The body 26 further comprises a second cutting element receiving location 39 that is positioned upstream of the first cutting element receiving location 38. The knife 37 can be displaced between the first 38 and the second 39 cutting element receiving locations to adapt the blow unit 8 to the kind of foil material F that has to be filled in the apparatus 1. The knife 37 may be provided in the first position 38 to fill a cushion foil comprising a pattern 14 of multiple little chambers 12 extending in rows in transverse and longitudinal direction. The knife 37 may be provided in the second position 39 to fill a cushion foil comprising multiple chambers extending in a single row between both longitudinal edges 15, 16 of the foil material F.

The knife 37 may be displaced by removing the knife 37 from the first position 38 and connecting it to the second position 39, for instance by means of a screw connection 29 or another suitable connection. To increase the flexibility of the blow unit 8, the knife 37 may instead be slidably arranged with respect to the body 26 of the blow unit 8. This may enable fast and easy displacement of the knife 37 depending on the kind of foil F to be used.

Figure 2:
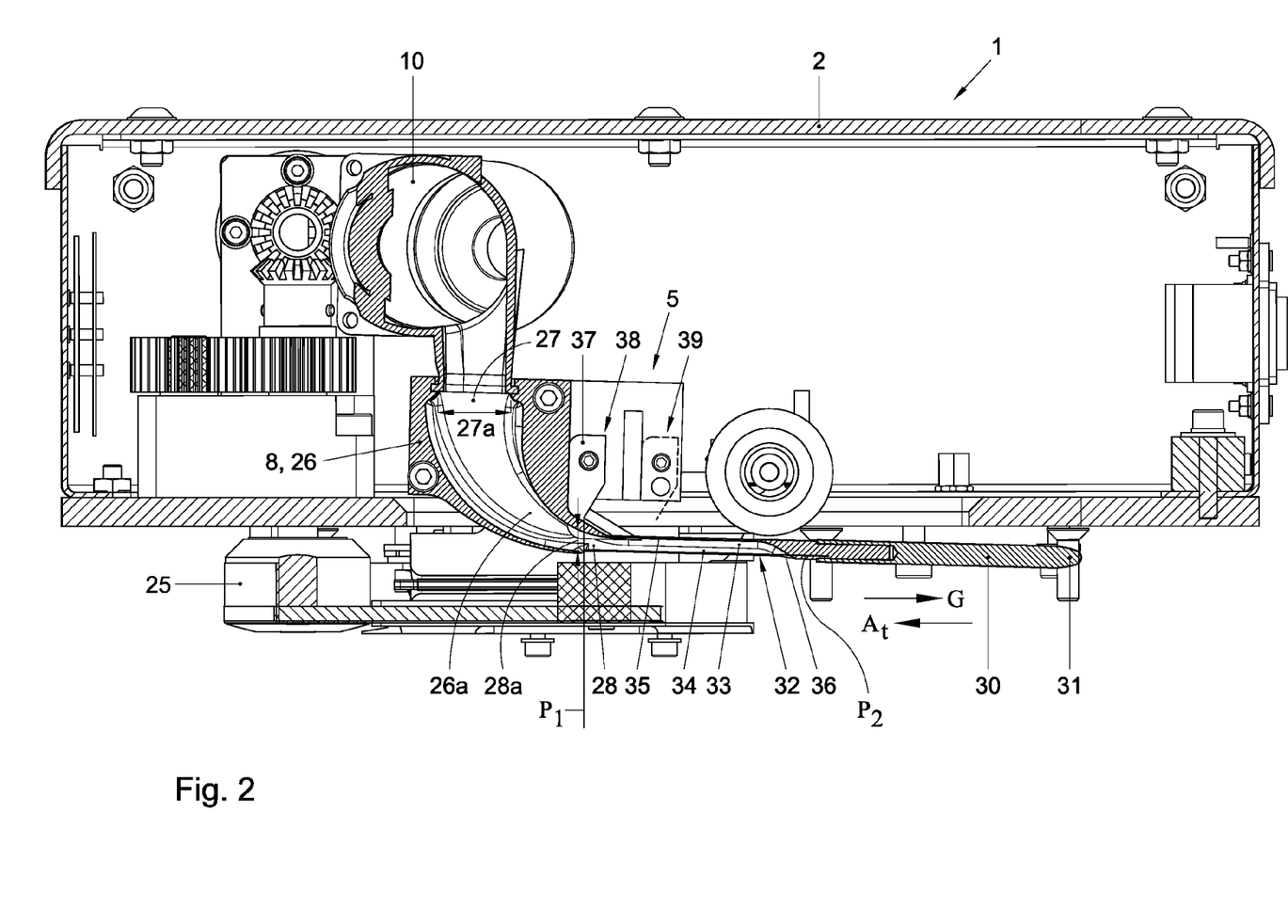
FIG. 2 shows a schematic cross sectional view of the apparatus as shown in FIG. 1.
Figure 3:
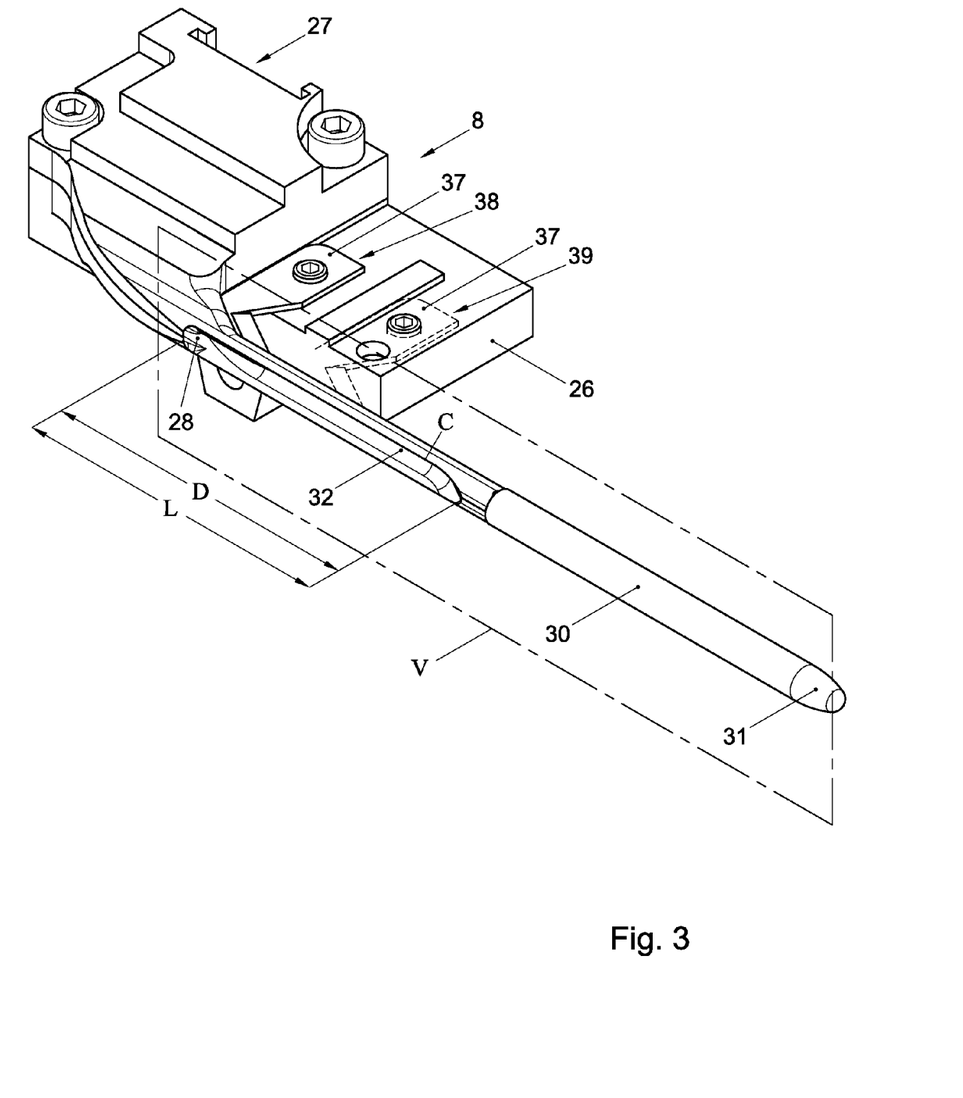
FIG. 3 shows a schematic perspective view of an embodiment of the blow unit according to the invention.
Figure 4:
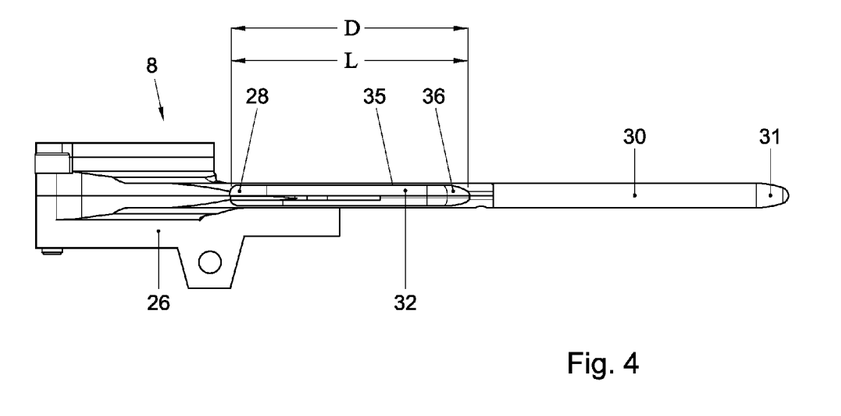
FIG. 4 shows a schematic side view of the blow unit as shown in FIG. 3.
Figure 5:
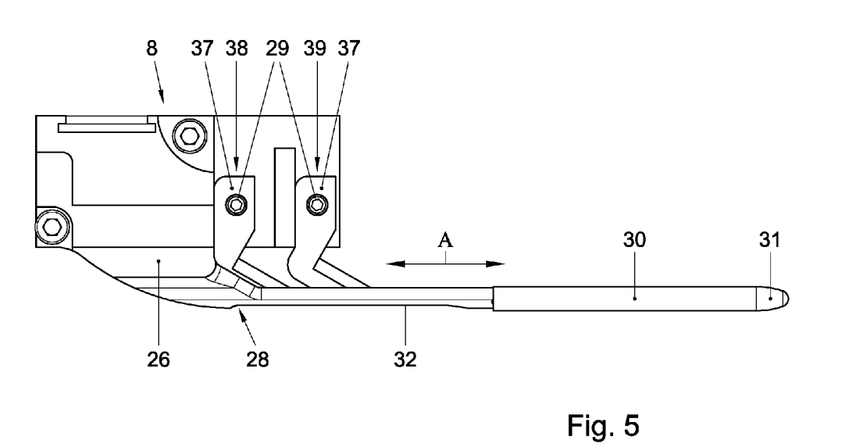
FIG. 5 shows a schematic top view of the blow unit as shown in FIGS. 3 and 4.

The apparatus 1 comprising the blow unit 8 according to the invention, as described hereinabove, works as follows (see FIGS. 2 and 6).

The foil material F is guided from the roll 4, via a guiding means 40 (see FIG. 1), to the inflating unit 5 and, at that location, is slid over the guiding element 30. Before doing so, the knife 37 is provided at the desired position 38, 39 dependent on the kind of foil material F. The guiding element 30 can reach through the passage S, formed between the cross sealing seams 17 and the first longitudinal edge 15 of the foil material F. At the passing of the knife 37, the first longitudinal edge 15 of the film material F is cut open. Dependent on the position of the knife 37, the opened chambers 12 are inflated after cutting of the longitudinal edge 15 or at the same time as the cutting of the longitudinal edge 15 takes place. When using the cushion foil material having relatively small chambers 12, for instance as shown in FIG. 6, the downstream chamber 12a may be positioned opposite the air outlet opening 28 of the blow unit and the upstream chamber 12b may be positioned opposite, at least part of, the air guiding space 32 at substantially the same moment. Due to the air guiding space 32, part of the air coming from the outlet opening 28 is directed towards the upstream chamber 12b while the major part of the air coming from the outlet opening 28 is introduced in the downstream chamber 12a to completely fill said chamber 12a. Due to the air guided by the air guiding space 32, the foil material surrounding the upstream chamber 12b will be pre-stretched and thus be subjected to less tension during filling of said chamber 12b later on. The foil material surrounding the downstream chamber is also subjected to less tension since part of the air for filling said chamber 12a does not reach the inner space of said chamber, but is guided towards the subsequent chamber 12b via the air guiding space 32. Furthermore, the air introduced in the upstream chamber 12b enhances easy guidance of the film material F along the guiding element 30 due to the air film created around said guiding element 30 by means of the air guiding space 32.

Since the cross sealing seam 17 ends at a short distance of the longitudinal edge 15 of the film material, a space S between the seam 17 and the edge 15 is defined. In use, the guiding element 30 is inserted in said space at the crossing between the downstream chamber 12a and the upstream chamber 12b. The space S has a diameter that is only slightly larger than the diameter of the guiding element 30. Due to the relatively small dimensions of the space S in comparison to the diameter of the guiding element 30, air is not able to flow to the upstream chamber 12b except in case that the air guiding space extends past the cross sealing seam 17 as is visible in FIG. 6. A surplus of supplied air will enter the empty upstream chamber 12b. Since sealing and therefore closing of the downstream chamber 12a directly takes place next to and downstream of the outlet opening 28, the filled chamber 12a can not deflate and remains filled at a maximum filling degree.

After inflating the downstream chambers 12a, the longitudinal edge 15 is sealed tight by the sealing unit 6, while the sealing seam formed (not shown) intersects with the cross sealing seams 17 in order to close the mouth 13 of the filled chambers 12. If desired, between the chambers 12, weakening lines, such as rows of perforations 19, can be provided along which the chambers 12 can be separated. Thus, a series of bags B can be realized which can serve as, for instance, protective material around vulnerable products, and/or as filling material in packages.

Sealing the chambers 12 tight proceeds as follows. The cut-open foil edges 15 are fed, clamped between the circulating belts 24, along the blocks 19, 20 (in the direction of arrow A, see FIG. 1) at the circulating rate of the respective belts 24. Both foil layers of the film material F are then heated locally by the sealing thread (not shown) and simultaneously pressed together by the blocks 19, 20 so that the foil layers are fused together and the sealing seam closing the filled chambers 12 is formed.

In the foregoing specification, the invention has been described with reference to specific examples of embodiments of the invention. It will, however, be evident that various modifications and changes may be made therein without departing from the broader spirit and scope of the invention as set forth in the appended claims. For instance, the blow unit may have one cutting element receiving location or even more than two, dependent on the kind of foil used on the apparatus comprising said blow unit. Furthermore, the air guiding space may have different shapes and different dimensions and also the guiding element may have different shapes and different dimensions. The cutting element may be displaceable arranged in different manners with respect to the body of the blow unit. The different parts of the blow unit may be of different materials, wherein the guiding element preferably comprises a material that prevents adhesion between the guiding element and the foil material. However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. Blow unit for an apparatus for making air-filled bags from a film material having chambers, wherein the blow unit comprises:
   a body having an outlet opening configured to introduce air into a space surrounded by the film material, at least into the chambers thereof,
   a guiding element configured to guide the film material towards the outlet opening, and
   an air guiding groove having an elongate bottom and a surrounding wall, the air guiding groove extends upstream from the outlet opening over a distance at least partly along the guiding element, wherein the air guiding groove is configured to, during introducing air into the space surrounded by the film material, introduce air into a chamber opposite the outlet opening and an adjacent chamber at substantially the same time.

2. Blow unit according to claim 1, wherein the air guiding groove has a substantially elongate shape having a length that is adapted to a width of a mouth of the chambers in the film material.

3. Blow unit according to claim 2, wherein an end of the air guiding groove has a shape configured to direct air passing through said air guiding groove in a direction away from the guiding element, the direction extending between 15-90 degrees with respect to a plane extending through the guiding element.

4. Blow unit according to claim 2, wherein a ratio of the length of the air guiding groove to the diameter of the outlet opening is approximately 15:1.

5. Blow unit according to claim 1, wherein a first plane extending through a circumference of the outlet opening extends substantially perpendicular to a guiding direction of the guiding element.

6. Blow unit according to claim 5, wherein a second plane extending through a circumference of an air guiding groove opening extends substantially parallel to a guiding direction of the guiding element.

7. Blow unit according to claim 6, wherein the first plane through the circumference of the outlet opening and the second plane through the air guiding groove opening extend substantially perpendicular to each other.

8. Blow unit according to claim 1, wherein a second plane extending through a circumference of an air guiding groove opening extends substantially parallel to a guiding direction of the guiding element.

9. Blow unit according to claim 1, wherein the blow unit comprises an inlet opening that is mountable to a pump unit, wherein a plane extending through a circumference of the inlet opening extends substantially perpendicular to a plane extending through the outlet opening.

10. Blow unit according to claim 9, wherein between the inlet opening and the outlet opening a substantially rigid air channel is provided.

11. Blow unit according to claim 9, wherein a ratio of the inlet opening diameter to an outlet opening diameter is approximately between 3:1 and 4:1.

12. Blow unit according to claim 1, wherein the blow unit further comprises a cutting element configured to cut the film material such that the film material can pass the blow unit.

13. Blow unit according to claim 12, wherein the cutting element is coupled to the body at a side of the guiding element which is opposite from another side having the air guiding groove.

14. Blow unit for an apparatus for making air-filled bags from a film material having chambers, wherein the blow unit comprises:
   a body having an outlet opening configured to introduce air into a space surrounded by the film material, at least into the chambers thereof;
   a guiding element configured to guide the film material towards the outlet opening;
   an air guiding space having an elongate bottom and a surrounding wall, the air guiding space extends upstream from the outlet opening over a distance at least partly along the guiding element, wherein the air guiding space is configured to, during introducing air into the space surrounded by the film material, introduce air into a chamber opposite the outlet opening and an adjacent chamber at substantially the same time; and
   a cutting element configured to cut the film material such that the film material can pass the blow unit,
   wherein the cutting element is displaceable with respect to the outlet opening.

15. Blow unit according to claim 14, wherein the cutting element is configured to be displaceable between a first position and a second position, wherein the cutting element is located adjacent to the outlet opening when in the first position, and the cutting element is located upstream of the outlet opening when in the second position.

16. Blow unit according to claim 14, wherein the cutting element is slidably arranged with respect to the body.

17. Blow unit for an apparatus for making air-filled bags from a film material having chambers, wherein the blow unit comprises:
   a body having an outlet opening configured to introduce air into a space surrounded by the film material, at least into the chambers thereof;
   a guiding element configured to guide the film material towards the outlet opening;
   an air guiding space having an elongate bottom and a surrounding wall, the air guiding space extends upstream from the outlet opening over a distance at least partly along the guiding element, wherein the air guiding space is configured to, during introducing air into the space surrounded by the film material, introduce air into a chamber opposite the outlet opening and an adjacent chamber at substantially the same time; and
   a cutting element configured to cut the film material such that the film material can pass the blow unit,
   wherein the cutting element is coupled to the body at a side of the guiding element which is opposite from another side having the air guiding space, and
   wherein the body comprises at least two cutting element receiving locations configured to receive the cutting element in a first position and a second position, respectively.

\* \* \* \* \*